United States Patent [19]

Keyworth et al.

[11] 4,153,669

[45] May 8, 1979

[54] REMOVAL OF METALS FROM WASTE MATERIALS THAT CONTAIN BIMETALLIC SALT COMPLEXES

[75] Inventors: Donald A. Keyworth, Houston; Jerome R. Sudduth, Pasadena, both of Tex.

[73] Assignee: Tenneco Chemicals, Inc., Saddle Brook, N.J.

[21] Appl. No.: 923,760

[22] Filed: Jul. 11, 1978

[51] Int. Cl.$^2$ .................... C01G 3/02; C01G 7/34; C01G 7/00; C01G 5/00
[52] U.S. Cl. .................................. 423/24; 423/43; 423/112; 423/127; 423/277; 75/117; 75/118 R
[58] Field of Search .................. 423/23, 24, 42, 43, 423/1, 112, 127, 277; 260/438.1; 75/101 BE, 109, 117, 118

[56] References Cited

U.S. PATENT DOCUMENTS

| | | | |
|---|---|---|---|
| 2,605,166 | 7/1952 | Landa et al. | 423/24 |
| 3,477,813 | 11/1969 | Fernald et al. | 423/127 |
| 3,678,112 | 7/1972 | Woolensak et al. | 423/127 |
| 3,679,751 | 7/1972 | Golden et al. | 423/277 |
| 3,845,188 | 10/1974 | Walker et al. | 423/42 |
| 3,887,600 | 6/1975 | Long et al. | 260/438.1 |

*Primary Examiner*—Brian Hearn
*Attorney, Agent, or Firm*—Evelyn Berlow

[57] ABSTRACT

Metals are removed from waste materials that contain an organic component and a bimetallic salt complex component that comprises complexes having the formula $M_I M_{II} X_n \cdot$Aromatic and/or the formula $M_I M_{II} X_n \cdot M_{II} OX \cdot$Aromatic, wherein $M_I$ is a Group I-B metal, $M_{II}$ is a Group III-A metal, X is halogen, n is the sum of the valences of $M_I$ and $M_{II}$, and Aromatic is a monocyclic aromatic hydrocarbon or halogenated aromatic hydrocarbon having 6 to 12 carbon atoms by contacting the waste material with water and sufficient alkali metal hydroxide to form a hydrolysis mixture which has a pH above 5 and which separates into an upper organic phase and a lower aqueous phase. After separation of the phases, there is obtained a slurry of $M_I$ oxide, $M_I$ hydroxide, and/or $M_{II}$ hydroxide from which the metals can be recovered or which can be discarded in ways that are not damaging to the environment. This process can be used, for example, to remove copper and aluminum from waste materials that contain $CuAlCl_4 \cdot$toluene and/or $CuAlCl_4 \cdot AlOCl \cdot$toluene.

10 Claims, No Drawings

REMOVAL OF METALS FROM WASTE MATERIALS THAT CONTAIN BIMETALLIC SALT COMPLEXES

This invention relates to a process for the removal of metals from waste materials that comprise bimetallic salt complexes having the generic formula $M_IM_{II}X_n$.Aromatic and/or the generic formula $M_IM_{II}X_n \cdot M_{II}OX$.Aromatic, wherein $M_I$ is a Group I-B metal, $M_{II}$ is a Group III-A metal, X is halogen, n is the sum of the valences of $M_I$ and $M_{II}$, and Aromatic is a monocyclic aromatic hydrocarbon or halogenated aromatic hydrocarbon having 6 to 12 carbon atoms. More particularly, it relates to a process for removing copper and aluminum from waste materials that comprise cuprous aluminum tetrachloride complexes.

Bimetallic salt complexes that have the generic formula

are known to be useful in the separation from gas mixtures of such complexible ligands as olefins, acetylene, aromatics, and carbon monoxide. For example, in U.S. Pat. No. 3,651,159, Long et al. disclosed a process in which a liquid sorbent that was a solution of cuprous aluminum tetrahalide in toluene was used to separate ethylene, propylene, and other complexible ligands from a gas feedstream. The complexed ligands were recovered by ligand exchange with toluene. The resulting solution of cuprous aluminum tetrahalide.toluene in toluene was recycled and used to separate additional quantities of the complexible ligands from the feedstream. Walker et al. in U.S. Pat. No. 3,647,843 disclosed a process in which a hydrocarbon pyrolysis gas stream was contacted with a cuprous aluminum tetrachloride solution in toluene to separate acetylene from the gas stream as a solution of the complex

in toluene. Acetylene was stripped from this complex with toluene, and the cuprous aluminum tetrachloride.-toluene complex was recycled.

In processes such as those disclosed by Long et al. and Walker et al. in which a liquid sorbent containing a bimetallic salt complex is recycled without purification and is used for long periods of time, there is a gradual increase in the amounts of reaction by-products and other impurities in it until sufficient impurities are present to interfere with the efficient operation of the process. For example, when the liquid sorbent is contacted with a gas feedstream that contains an olefin having 2 to 4 carbon atoms, some of the olefin reacts with the aromatic hydrocarbon or halogenated aromatic hydrocarbon in the sorbent to form alkylated aromatic compounds, and some undergoes polymerization to form olefin oligomers. Any water that is present in the gas stream reacts with bimetallic salt complex to form the complex $M_IM_{II}X_n \cdot M_{II}OX$.Aromatic, which has limited solubility in the liquid sorbent. When it contains amounts of these and other contaminants that are sufficient to coat heat exchangers, clog lines, and otherwise foul the equipment, the liquid sorbent must be purified, for example, by cooling to precipitate a sludge that comprises the slightly-soluble bimetallic salt complexes and separating this sludge from it, or replaced by fresh liquid sorbent.

When a Group I-B metal halide is reacted with a Group III-A metal halide in the presence of an aromatic hydrocarbon solvent to form the liquid sorbent, there is usually also formed a small amount of sludge that contains a major amount of the bimetallic salt complex $M_IM_{II}X_n \cdot M_{II}OX$, resulting from the presence of contaminants such as $M_{II}OX$ and water in the reactants. This sludge, which is only slightly soluble in the liquid sorbent, is removed before the sorbent is used to separate complexible ligands from gas feedstreams.

Because of their high metal contents, the spent liquid sorbent, sludge separated from liquid sorbent, and sludge formed during the preparation of the liquid sorbent cannot be discharged into sewers or waste ponds without causing serious pollution problems. In addition, it is economically desirable to recover the metals, which are usually copper and aluminum, from these waste materials.

Several processes have been proposed for the separation of metals from sludge and from spent liquid sorbents that comprise the bimetallic salt complex $M_I M_{II}X_n$.Aromatic. In U.S. Pat. No. No. 3,845,188, Walker et al. disclosed a process in which the Group I-B metal in the spent liquid sorbent is recovered as its halide by contacting the liquid sorbent with anhydrous ammonia and separating from the sorbent the metal halide that precipitates. It has been proposed that the waste materials be burned, but since these materials contain about 30% of metal salts, this process leaves a substantial metal ash that must be disposed of in a manner consistent with environmental conservation. These processes are generally uneconomical and impractical to carry out on an industrial scale, and they may cause pollution problems.

This invention relates to an improved process for the removal of metals from waste materials that comprise a bimetallic salt complex component that contains the complex $M_IM_{II}X_n$.Aromatic, the complex $M_IM_{II}X_n \cdot M_{II}OX$.Aromatic, or a mixture of these complexes, and an organic component that contains an aromatic hydrocarbon, a halogenated aromatic hydrocarbon, an alkylated aromatic hydrocarbon, olefin oligomers, tars, or a mixture thereof. These waste materials may be spent liquid sorbent that has been used to remove complexible ligands from gas feedstreams, sludge separated from freshly-prepared liquid sorbent, or sludge separated from spent liqid sorbent. This process, which is more efficient and more economical to operate than that disclosed in U.S. Pat. No. No. 3,845,188 and which avoids the pollution problems associated with the previously-proposed processes, provides an environmentally-safe procedure for the disposal of the bimetallic salt complex-containing waste materials, and it provides an efficient procedure for the removal of metals from these waste materials.

In the process of this invention, the bimetallic salt complex-containing waste material from which the metals are to be removed is hydrolyzed with an aqueous alkali metal hydroxide solution to form a hydrolysis mixture that has a pH above 5 and that separates into an upper organic phase and a lower aqueous phase that is a slurry containing $M_I$ oxide, $M_I$ hydroxide, and/or $M_{II}$ hydroxide. After separation of the phases, the organic phase may be distilled to separate aromatic hydrocarbons from it, or it may be incinerated without causing pollution problems.

The slurry may be pumped to a waste-disposal pond and maintained at a pH of 7 without concern about loss of metals to the environment, or if it is desirable to convert $M_I$ compounds to an even less soluble form the slurry may be treated with sodium hydrosulfide to convert them to $M_I$ sulfide before it is transferred to the waste-disposal pond or pit. Alternatively, the metals can be recovered from the slurry by methods that are known in the art.

The spent liquid sorbents from which metals are removed by the process of this invention are solutions of bimetallic salt complexes in an aromatic hydrocarbon or a halogenated aromatic hydrocarbon that may contain alkylated aromatic hydrocarbons, alkylated halogenated aromatic hydrocarbons, olefin oligomers, other bimetallic salt complexes and/or tars. The bimetallic salt complexes in the liquid sorbents have the generic formula $M_I M_{II} X_n$·Aromatic and/or the generic formula $M_I M_{II} X_n \cdot M_{II} OX$ Aromatic. $M_I$ is a Group I-B metal; that is, copper, silver, or gold. Copper (I) is the preferred metal. $M_{II}$ is a Group III-A metal; that is boron, aluminum, gallium indium, or thallium. Boron and aluminum are the preferred metals, aluminum being particularly preferred. X is halogen, i.e., fluorine, chlorine, bromine, or iodine; it is preferably chlorine or bromine. The sum of the valences of $M_I$ and $M_{II}$ is represented by n. Aromatic is a monocyclic aromatic hydrocarbon or halogenated aromatic hydrocarbon having 6 to 12 carbon atoms, preferably 6 to 9 carbon atoms, such as benzene, toluene, ethylbenzene, xylene, mesitylene, chlorobenzene, bromobenzene, iodobenzene, dichlorobenzene, dibromobenzene, chlorotoluene, bromotoluene, iodotoluene, or chloroxylene. It is preferably benzene or toluene. Illustrative of these bimetallic salt complexes are the following: $CuBF_4$·benzene, $CuBCl_4$·benzene, $AgBF_4$·mesitylene, $AgBCl_4$·xylene, $AgAlCl_4$·xylene, $AgAlBr_4$·bromobenzene, $CuGaCl_4$·toluene, $CuInI_4$·1,2-dichlorobenzene, $CuTl\ I_4$·p-chlorotoluene, and the like. The bimetallic salt complexes in the waste material is usually $CuAlCl_4$·benzene, $CuAlCl_4$·toluene, or $CuAlBr_4$·benzene. The aromatic hydrocarbon or halogenated aromatic hydrocarbon in which the bimetallic salt complex is dissolved is usually and preferably the same as that used in the preparation of the bimetallic salt complex, but if desired it may be a different one. The total amount of aromatic hydrocarbon or halogenated aromatic hydrocarbon in the liquid sorbent, that is, the amount in the bimetallic salt complex plus the amount used as solvent, is at least 10 mole percent of the amount of the bimetallic salt $M_I M_{II} X_n$ that is present. It is preferred that the amount of aromatic hydrocarbon or halogenated aromatic hydrocarbon be 100 to 450 mole percent of the amount of the bimetallic salt. The particularly preferred liquid sorbents contain 25 to 75 percent by weight of $CuAlCl_4$·benzene in benzene or $CuAlCl_4$·toluene in toluene.

The sludges from which the metals can be removed by this process generally comprise a major amount of the bimetallic salt complex $M_I M_{II} X_n \cdot M_{II} OX$·Aromatic, which is usually $CuAlCl_4 \cdot AlOCl$·toluene, and minor amounts of an aromatic hydrocarbon, such as benzene or toluene. They may also contain other bimetallic salt complexes, such as $M_I M_{II} X_n$·Aromatic, which is usually $CuAlCl_4$·toluene or $CuAlCl_4$·benzene, organic reaction by-products, and tars.

In a preferred embodiment of this invention, the bimetallic salt complex-containing waste material from which metals are removed is either (1) a liquid sorbent that is a solution of cuprous aluminum tetrachloride in benzene or toluene that has been used in a process for the removal of carbon monoxide, ethylene, or other complexible ligands from a gas feedstream until it contains an amount of such impurities as alkylated aromatic compounds, olefin oligomers, tars, $CuAlCl_4 \cdot AlOCl$, and other sorbent-insoluble bimetallic salt complexes that interferes with the efficient operation of the ligand separation process and necessitates the replacement of the liquid sorbent in the system, (2) a sludge that comprises bimetallic salt complexes formed by the reaction of cuprous aluminum tetrachloride with small amounts of water, hydrogen sulfide, amines, or alcohols that are present as contaminants in the gas feedstream and that has been separated from the cold liquid sorbent, or (3) a sludge that is formed during the preparation of the liquid sorbent and that comprises a major amount of $CuAlCl_4 \cdot AlOCl$ and minor amounts of $CuAlCl_4$ and either benzene or toluene. If the waste material contains a high concentration of tars, alkylated aromatic hydrocarbons, and/or olefin oligomers, it may be diluted with from one-half to twice its volume of an aromatic hydrocarbon to improve its handling and pumping characteristics before it is treated by the process of this invention. It is preferably diluted with an equal volume of toluene.

In this process, the waste material is contacted with water and sufficient alkali metal hydroxide to form a hydrolysis mixture that has a pH in the range of 5 to 7, preferably 6 to 7, and in which substantially all of the copper has been converted to copper oxide and all of the aluminum to aluminum hydroxide. When hydrolysis is complete, the hydrolysis mixture separates into an upper organic phase that contains a major amount of toluene or benzene and a lower aqueous phase that is a slurry of copper oxide and aluminum hydroxide. After separation of the organic phase from it, the slurry may be safely discarded in a waste-disposal pond or pit. If it is desired to convert the copper to a compound that is less soluble than copper oxide, the slurry may be treated with sodium hydrosulfide before it is discarded. Alternatively, the slurry or metal compounds that have been separated from it can be sent to a metal processor for salvage. The separated organic phase may be incinerated, or it may be distilled to separate toluene and benzene from it.

In another preferred embodiment of the invention, the waste material from which metals are to be removed is contacted with water and sufficient sodium hydroxide to form a hydrolysis mixture that has a pH of at least 11. After removal of the organic layer from the hydrolysis mixture, precipitated copper hydroxide is removed from it by filtration. The recovered copper hydroxide may be used as landfill or it may be converted to copper metal. The filtrate contains soluble sodium aluminate which can be converted to aluminum hydroxide which can be used as a flocculation agent in a settling pond.

The invention is further illustrated by the following examples.

EXAMPLE 1

A. A liquid sorbent that contained 28.6 mole percent of cuprous aluminum tetrachloride and 71.4 mole percent of toluene was prepared by adding 1.1 moles of cuprous chloride to 1 mole of anhydrous aluminum chloride in toluene. The resulting solution was filtered to remove unreacted cuprous chloride and insoluble impurities from it.

B. A gas mixture obtained by the pyrolysis of natural gas had the following composition:
Hydrogen — 560 mm.
Carbon monoxide — 280 mm.
Acetylene — 75 mm.
Methane — 60 mm.
Carbon dioxide — 25 mm.

The pyrolysis gas was fed at ambient temperature and 19 psia pressure to an absorption column in which it was contacted with an amount of the liquid sorbent of Example 1A that contained at least sufficient cuprous aluminum tetrachloride to react with all of the acetylene and carbon monoxide in the feed gas. The acetylene and carbon monoxide in the gas mixture reacted with the liquid sorbent as it traveled through the column to form a solution that contained the acetylene-cuprous aluminum tetrachloride complex and the carbon monoxide-cuprous aluminum tetrachloride complex. This solution was fed to a stripping column in which it was brought into contact with benzene vapor at 80° C. The mixture of benzene vapor and carbon monoxide that left the column was cooled to 25° C. to separate the carbon monoxide from the benzene. The sorbent solution which then contained cuprous aluminum tetrachloride and the acetylene-cuprous aluminum tetrachloride complex was fed to a stripping column in which it was brought into contact with benzene vapor at 95° C. The vapor that left the column was cooled to condense the benzene and separate it from the acetylene. The stripped sorbent was returned to the absorption column where it reacted with additional amounts of carbon monoxide and acetylene in the gas stream.

C. After it had been used for several months in the process described in Example 1B, the liquid sorbent which contained impurities that interfered with its use in the removal of carbon monoxide and acetylene from the gas feedstream was replaced with fresh liquid sorbent.

D. The spent liquid sorbent, which had a specific gravity of 1.22, was added incrementally to 240 grams of 15% aqueous sodium hydroxide solution. During the addition, the hydrolysis mixture was stirred efficiently, and its pH was monitored. When 100 ml. of spent liquid sorbent had been added to it over a period of 15 minutes, the hydrolysis mixture, whose pH was 9.6 and whose temperature had risen to 80° C., developed an upper phase consisting largely of toluene and a lower aqueous phase that contained about 75 ml. of precipitated copper oxide. When 110 ml. of spent liquid sorbent had been added, the aqueous phase, which had a pH of 6.8, was a slurry having a paint-like consistency. Following the separation of the organic phase from it, the slurry was discharged to a waste-disposal pond. The organic phase was distilled, and the recovered toluene was recycled to Step 1A.

EXAMPLE 2

To 127 pounds of a sludge that comprised CuAlCl$_4$.AlOCl, CuAlCl$_4$.toluene, toluene, alkylated toluenes, and tars was added 24 pounds of 50% aqueous sodium hydroxide solution and then 214 pounds of water while the hydrolysis mixture was being stirred. The hydrolysis mixture, which had a pH of 6, separated into an upper organic phase and a lower aqueous phase that was a slurry of paint-like consistency that contained copper oxides and aluminum hydroxide.

The organic phase was separated and distilled to recover toluene from it.

To the slurry was added 42 pounds of 20% aqueous sodium hydrosulfide solution to convert the copper oxides to copper sulfide. The resulting black slurry was pumped to a waste-disposal pond.

This process can be used in a similar way to remove metals from the other bimetallic salt complex-containing waste materials disclosed herein.

What is claimed is:

1. The process for the removal of metals from waste materials that comprise a bimetallic salt complex component selected from the group consisting of complexes having the formula $M_I M_{II} X_n$.Aromatic; complexes having the formula $M_I M_{II} X_n$. $M_{II}$OX.Aromatic; and mixtures thereof, wherein $M_I$ is a Group I-B metal, $M_{II}$ is a Group III-A metal, X is halogen, n is the sum of the valences of $M_I$ and $M_{II}$ and Aromatic is a monocyclic aromatic hydrocarbon or halogenated aromatic hydrocarbon having 6 to 12 carbon atoms, and an organic component selected from the group consisting of monocyclic aromatic hydrocarbons having 6 to 12 carbon atoms, halogenated aromatic hydrocarbons having 6 to 12 carbon atoms, alkylated aromatic hydrocarbons, olefin oligomers, tars, and mixtures thereof that comprises the steps of
    (a) contacting said waste material with water and sufficient alkali metal hydroxide to form a hydrolysis mixture having a pH above 5;
    (b) allowing the hydrolysis mixture to separate into an upper organic phase and a lower aqueous phase that is a slurry of water-insoluble compounds selected from the group consisting of $M_I$ oxide, $M_I$ hydroxide, $M_{II}$ hydroxide, and mixtures thereof; and
    (c) separating the organic phase from the aqueous phase.

2. The process of claim 1 wherein the bimetallic salt complex component of the waste material is selected from the group consisting of CuAlCl$_4$.toluene, CuAlCl$_4$.benzene, CuAlCl$_4$. AlOCl.toluene, CuAlCl$_4$.AlOCl.benzene, and mixtures thereof.

3. The process for the removal of copper and aluminum from waste materials that comprise a bimetallic salt complex component selected from the group consisting of CuAlCl$_4$.Aromatic, CuAlCl$_4$.AlOX.Aromatic, and mixtures thereof, wherein Aromatic is a monocyclic aromatic hydrocarbon or halogenated aromatic hydrocarbon having 6 to 12 carbon atoms, and an organic component selected from the group consisting of monocyclic aromatic hydrocarbons having 6 to 12 carbon atoms, monocyclic halogenated aromatic hydrocarbons having 6 to 12 carbon atoms, alkylated aromatic hydrocarbons, olefin oligomers, tars, and mixtures thereof that comprises the steps of
    (a) contacting said waste material with water and sufficient sodium hydroxide to form a hydrolysis mixture having a pH above 5;
    (b) allowing the hydrolysis mixture to separate into an upper organic phase and a lower aqueous phase that is a slurry of compounds selected from the group consisting of copper and aluminum oxides and hydroxides; and
    (c) separating the organic phase from the aqueous phase.

4. The process of claim 3 wherein the hydrolysis mixture formed in Step a) has a pH in the range of 5 to 7.

5. The process of claim 3 wherein the hydrolysis mixture formed in Step a) has a pH of at least 11.

6. The process of claim 3 wherein the bimetallic salt complex-containing component of the waste material is selected from the group consisting of $CuAlCl_4$.toluene, $CuAlCl_4$.benzene, $CuAlCl_4$.AlOCl.toluene, $CuAlCl_4$.AlOCl.benzene, and mixtures thereof.

7. The process of claim 3 wherein the organic component of the waste material comprises toluene.

8. The process of claim 3 wherein the aqueous phase separated in Step c) is contacted with sodium hydrosulfide to convert the copper oxide in the slurry to copper sulfide.

9. The process of claim 3 wherein the waste material is diluted with from one-half to twice its volume of an aromatic hydrocarbon before it is contacted with water and sodium hydroxide in Step a).

10. The process of claim 3 wherein the waste material is diluted with an equal volume of toluene before it is contacted with water and sodium hydroxide in Step a).

* * * * *